April 18, 1933.  J. W. COFFMAN  1,903,981
MOTION PICTURE FILM
Filed Sept. 25, 1928
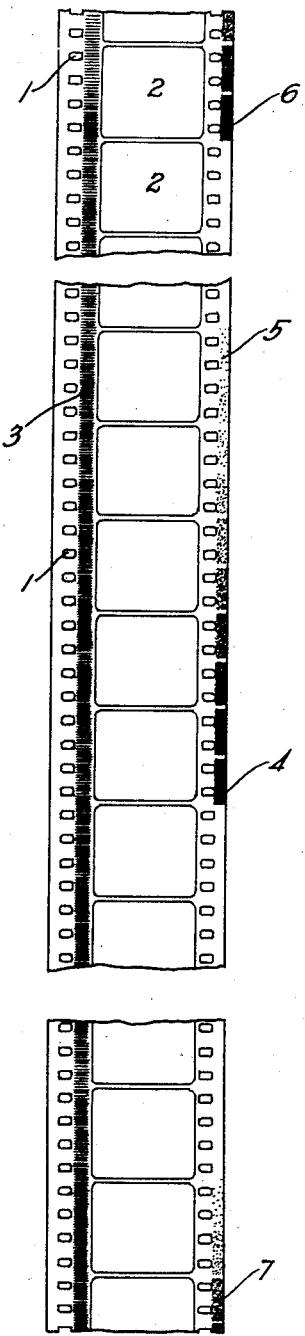
INVENTOR
J. W. COFFMAN
BY
G. H. Heydt
ATTORNEY Patented Apr. 18, 1933

1,903,981

UNITED STATES PATENT OFFICE

JOE W. COFFMAN, OF JACKSON HEIGHTS, NEW YORK, ASSIGNOR TO BELL TELEPHONE LABORATORIES INCORPORATED, OF NEW YORK, N. Y., A CORPORATION OF NEW YORK

MOTION PICTURE FILM

Application filed September 25, 1928. Serial No. 308,166.

This invention relates to improvements in photographic processes.

In preparing motion picture films it is necessary that the final positive print shall have an overall contrast within definite limits. It is well known in the photographic art that the overall contrast of the final print is equal to the product of the contrast to which the positive film is developed multiplied by the contrast to which the negative film was developed. In order to make positive prints intelligently it is therefore necessary that the contrast to which the negative was developed be known. A common method of providing a record from which the contrast to which the negative was developed may be obtained, is to print on the negative film from a standard tablet a sensitometer strip. These sensitometer strips are well known in the art and comprise a series of frames usually ten in number varying in density from the density of unexposed film to substantial opacity. Thus the end frames represent the maximum and minimum of translucency while the intermediate frames represent graded steps between such values. By means of a diffused printing light the sensitometer tablet is printed on the negative film. After the negative film is developed the sensitometer record may be interpreted by photometric means to establish readings from which a Hurter and Driffield curve may be plotted. The slope of this curve will produce the gamma or overall contrast to which the negative has been developed. This method while theoretically satisfactory has certain practical disadvantages. A moving picture is made up of many scenes and each scene may be a separate film length. On the end of each of these film lengths will appear a sensitometer record. After the positive of the film has been printed and cut and reassembled, it frequently happens that the sensitometer strips accompanying the original portions are cut off and lost. As a result if at some later time it becomes desirable to print additional positives of the film, there is no data at hand which will provide information as to the proper development for the positive film unless extensive bookkeeping arrangements are made so that a record of each portion of the film is available at any time it is required.

It is the object of this invention to provide a sensitometer record for negative film which cannot be destroyed and which will be available as long as the negative film is available.

Referring now to the drawing there is shown a motion picture film, which in this case has been assumed to carry both sound and picture records. The film is provided with the usual sprocket holes 1—1. The picture portion of the film is occupied by the successive frames 2—2. To the left of the pictures as shown in the drawing is a sound track 3. It is, of course, obvious that the invention may be applied to standard picture film which does not have the sound accompaniment in which case the picture frames occupy substantially all of the space between the sprocket holes. On the right hand edge of the central portion of the film is indicated a sensitometer record made from a standard tablet. In this case it has been assumed that the length of each frame of the sensitometer record is one-half that of a picture frame and related to the sprocket holes as shown. It is, of course, obvious that the sensitometer frames may be of any convenient length.

In accordance with this invention the unexposed negative film is run through a printing device which will expose on the edge of the film beyond the sprocket holes or on any unused portion of the film a sensitometer record obtained from a standard tablet. After the unused portion of the film has been exposed at recurring intervals at probably 3 to 4 feet throughout the length of the film, the film is ready for use. In passing through the motion picture camera the unused portion of the film must be masked off to prevent additional exposure. When the negative film is developed the sensitometer record will be developed along with the picture and sound records and since it recurs every few feet it will be available as long as the negative is available.

The drawing shows the sensitometer record in developed form and indicates in conventional manner how the successive frames vary in exposure longitudinally of the film and shade from the darkest at 4 down to the lightest at 5. The recurring nature of this sensitometer record is indicated at 6 and 7 of the drawing. It will be noted that the sensitometric records each bear the same accurate dimensional relation to the sprocket holes.

It is believed to be obvious that the sensitometer record may be printed on any portion of the film which is not to be used for the normal photographic purposes. Thus in the film shown, in case no sound track is to accompany the picture the space at present used by the sound track could be used for the sensitometer record. Similarly, it is also obviously within the scope of the invention to utilize both edges of the film in staggered relation in accordance with the convenience of the film manufacturer.

What is claimed is:

A band of sensitized film having thereon at intervals throughout its length latent images of sensitometric strips, and having a longitudinal series of exactly spaced perforations, each sensitometric strip image varying in exposure longitudinally of the band in an accurate dimensional relation to the perforations.

In witness whereof, I hereunto subscribe my name this 21st day of September, 1928.

JOE W. COFFMAN.